United States Patent
Roe et al.

(10) Patent No.: US 7,055,667 B2
(45) Date of Patent: Jun. 6, 2006

(54) VACUUM ACTUATED WHEEL HUB

(75) Inventors: Erik Roe, Portland, OR (US); Bryan M Averill, Portland, OR (US); Fred L Ewer, Clackamas, OR (US)

(73) Assignee: Warn Industries, Inc., Milwaukie, OR (US)

( * ) Notice: Subject to any disclaimer, the term of this patent is extended or adjusted under 35 U.S.C. 154(b) by 1 day.

(21) Appl. No.: 10/842,019

(22) Filed: May 7, 2004

(65) Prior Publication Data

US 2005/0247536 A1 Nov. 10, 2005

(51) Int. Cl.
*F16D 11/14* (2006.01)

(52) U.S. Cl. .................. 192/69.41; 192/88 A; 180/247

(58) Field of Classification Search .............. 180/247; 192/69.4, 69.41, 69.9, 88 A
See application file for complete search history.

(56) References Cited

U.S. PATENT DOCUMENTS

| | | | |
|---|---|---|---|
| 5,141,088 A | * | 8/1992 | Kurihara et al. .......... 192/69.41 |
| 5,353,890 A | | 10/1994 | Clohessy |
| 5,445,258 A | | 8/1995 | Bigley et al. |
| 5,520,272 A | | 5/1996 | Ewer et al. |
| 5,535,869 A | | 7/1996 | Bigley et al. |
| 5,586,632 A | | 12/1996 | Bigley et al. |
| 5,806,623 A | | 9/1998 | Clohessy |
| 5,908,080 A | | 6/1999 | Bigley et al. |

* cited by examiner

*Primary Examiner*—Saul Rodriguez
(74) *Attorney, Agent, or Firm*—Harness, Dickey & Pierce, P.L.C.

(57) ABSTRACT

An interlock mechanism is provided for a wheel end disconnect device. The interlock mechanism is activated by negative pressure for engaging and disengaging a wheel hub from an axle shaft. Vacuum pressure is routed through a wheel bearing for activating the interlock mechanism.

10 Claims, 5 Drawing Sheets

VACUUM ACTUATED WHEEL HUB

FIELD OF THE INVENTION

The present invention relates to an interlock mechanism and more particularly to an actuating mechanism that includes air pressure passages routed through the wheel bearing for actuating the interlock mechanism.

BACKGROUND AND SUMMARY OF THE INVENTION

An interlock mechanism as contemplated by the present invention is used in the drive line of a vehicle for releasably locking a driven member to a drive member. A specific example is a hub lock (interlock mechanism) for locking and unlocking a wheel hub (a driven member) to a wheel axle (a drive member).

Actuating mechanisms are provided for actuating a hub lock mechanism that is referred to as a pulse actuated interlock mechanism. The mechanism includes a piston and latch member that responds to a force, e.g., air pressure (negative or positive). The force moves the piston which moves a clutch ring to an interlocking relation with both the driven and drive members. The piston is latched to the latch member. The force is withdrawn whereas the piston is retained in the latched position. (The force which moves the piston to the latched position and is then withdrawn is here referred to as a first pulsating force.) A second pulsating force moves the piston relative to the latch member to release the latched engagement and the piston is returned to a withdrawn position. The clutch ring is moved to an engaged position and a disengaged position in response to unlatching and latching of the piston and latch member.

The latching mechanism relies on relative movement of the piston and latch members to accomplish latching and unlatching of the piston. The latch member is a cam-like member rotatively fixed and provided on the inner wall of the housing for the interlock mechanism.

Other hub locks are known in which a positive or negative pressure is utilized to constantly maintain the interlock mechanism in an engaged or disengaged position. With many of these known interlock mechanisms, both of the pulse activated and constantly applied pressure types, it is a challenge to provide a sealed connection path between the vacuum fitting and the rotating interlock mechanism. Previously, the vacuum fitting was provided in the steering knuckle which required large elaborate seals to be used between the steering knuckle and axle shaft.

The present invention provides a vacuum path for an interlock mechanism that extends through the wheel bearing and then to the wheel hub. Providing the vacuum path through the wheel bearing allows the wheel hub disconnect technology to be easily applied with minimal change to the existing wheel end or knuckle designs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
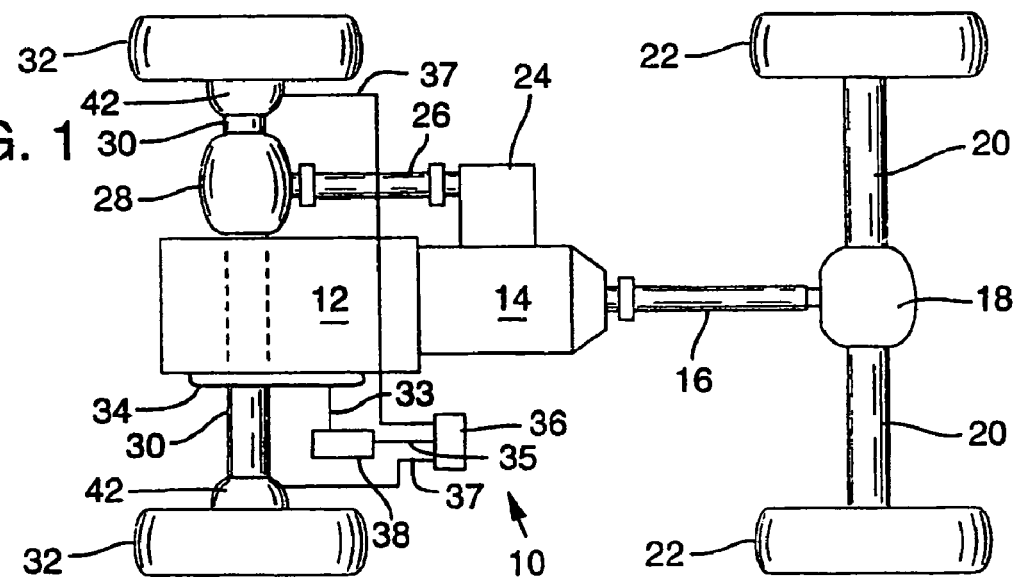
FIG. 1 is a schematic illustration of a vehicle power train according to the principles of the present invention.

With reference now to FIG. 1 of the drawings which illustrates in plan view a chassis 10 of a vehicle that is arranged to be operated in either two-wheel drive or four-wheel drive mode. The chassis 10 includes a drive motor 12 that is coupled to a transmission 14. A drive shaft 16 connects the transmission to a rear differential 18 and the rear differential 18 has axles 20 extending to rear wheels 22. A transfer case 24 is coupled to the transmission 14 and couples/uncouples a front drive shaft 26 to a front differential 28. Front drive axles 30 extend from the differential 28 to the front wheel assemblies 32. The front wheel assemblies 32 are arranged to be either coupled to the drive axles 30 or uncoupled from the drive axles 30 as will be later described and illustrated. The wheel assemblies 32 include steering knuckles 42 which are provided to facilitate steering the vehicle. The drive motor 12 includes an intake manifold 34 which provides a source of negative air pressure that is utilized in one embodiment of the invention to operate the pulse operated interlock mechanism of the present invention. A tank 38 is coupled to the intake manifold 34 via line 33 to provide an adequate supply of pressurized air to operate the pulse actuated interlock mechanism. By "pressurized" air or gas, it is meant that either positive or negative pressure can be utilized with an appropriate interlock mechanism. A known control device 36 connected to the tank 38 via line 35 controls the magnitude of the negative air pressure and the flow of air to and from the pulse operated mechanism. Air lines 37 connected to the controller 36 and each knuckle 42 are provided for the air flow to and from the pulse operated mechanisms.

The vehicle is operable in either two-wheel drive mode or four-wheel drive mode. In two-wheel drive mode, only the rear wheels 22 are driven by the motor 12. In two-wheel drive mode the transfer case 24 is uncoupled. That is, it does not supply rotative power from the transmission 14 to the front drive shaft 26. Also, the front wheels 32 are uncoupled from the front axles 34 so that the front wheels 32 will not rotatively drive the front axles 30, the differential 28 and the front drive shaft 26 when the vehicle is in motion. To operate the vehicle in four-wheel drive mode, the transfer case 24 is shifted to its coupled position so that it will provide rotative power from the transmission 14 to the front drive shaft 26. The front drive shaft 26 in turn will drive the differential 28 and the front drive axles 30. The wheel assemblies 32 are also coupled to the front drive axles 30 so that the motive power of the engine 12 will be supplied to the front wheels 32 as well as the rear wheels 22. It should be understood that the present invention can be employed with a transaxle-type drive train with primary front wheel drive and rear wheels that can be coupled and uncoupled to the rear axles.

A pulse operated interlock mechanism of the present invention is incorporated into the front wheel assemblies 32 (or rear wheel assemblies for a transaxle drive train) to either couple a wheel hub to a drive axle 30 or to uncouple a wheel hub from the drive axle 30. The interlock mechanism can be engaged for four wheel drive shift on the fly or while the vehicle is stationary.

Figure 2:
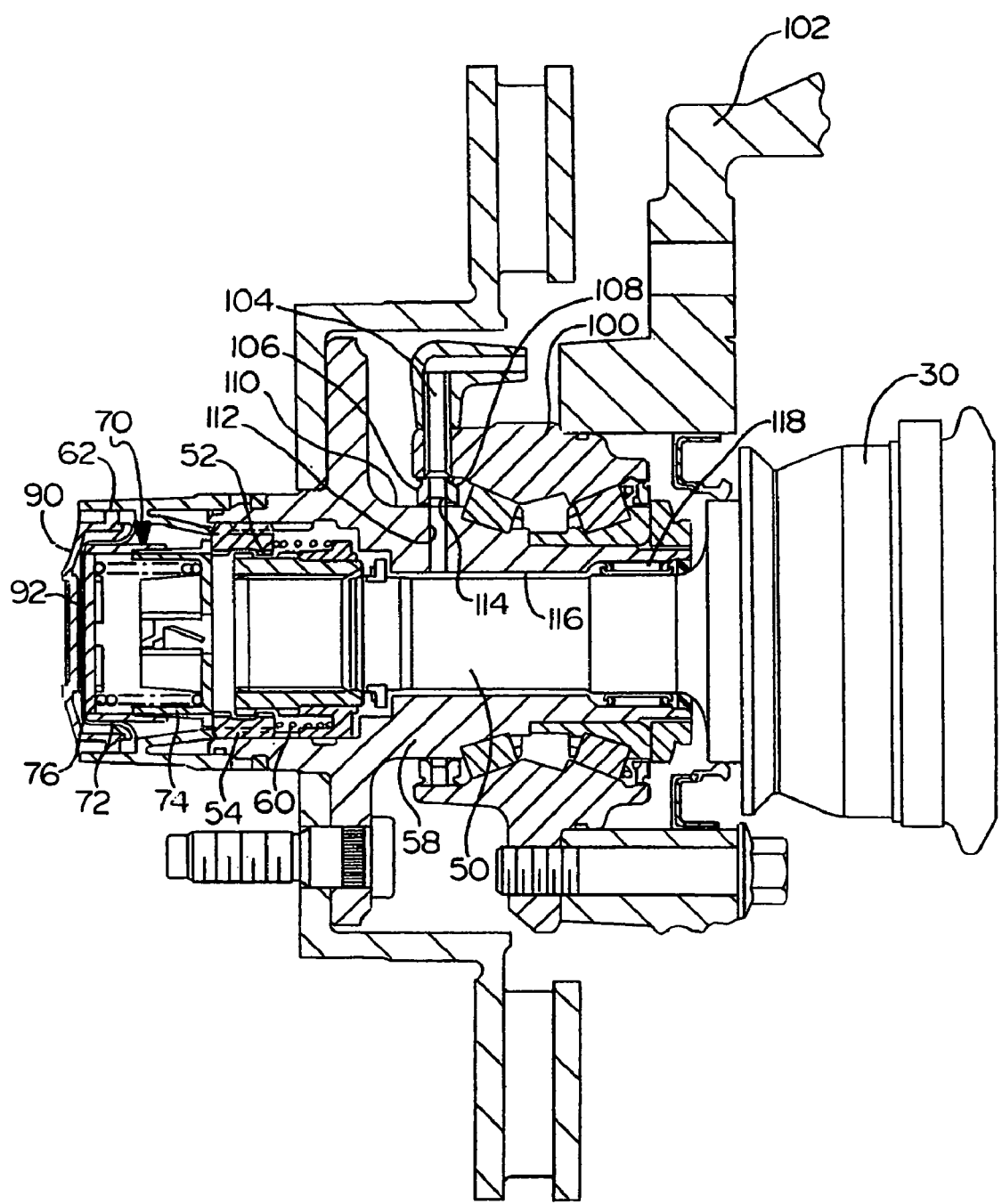
FIG. 2 is a sectional view of an interlock mechanism of a wheel end disconnect system according to a first embodiment of the present invention.

Referring now to FIG. 2 of the drawings which illustrate schematically the operation of the pulse actuated interlock mechanism of the present invention. As shown, an end 50 of the drive axle 30 is received within a wheel hub 58. Mounted on the end 50 of the axle 30 is a drive gear 52. A clutch ring 54, which in this embodiment is in full time engagement with the wheel hub 58, is slidably movable to be either in engagement with the drive gear 52 or out of engagement with the drive gear 52. When the clutch ring 54 is in engagement with the drive gear 52, the wheel hub 58 will be coupled to the drive axle 30 and when the clutch ring 54 is out of engagement with the drive gear 52, the wheel hub 58 will be out of engagement with the axle 30. A return spring 60 urges the clutch ring 54 out of engagement with the drive gear 52.

A housing 62 is mounted to the end of the wheel hub 58 and has a diaphragm 90 mounted in its end portion adjacent an end cap 92 fitted to the end of the housing 62. A piston assembly 70 has a primary piston 72 in abutment with the diaphragm 90 and has a secondary piston 74 in abutment with the clutch ring 54. An engagement spring 76 is captive between the primary piston 72 and the secondary piston 74. The engagement spring 76 urges the primary piston 72 and the secondary piston 74 to move axially away from each other. The primary piston 72 and the secondary piston 74 are arranged to be either latched together such that the spring 76 will not move the pistons 72, 74 away from each other or to be in an unlatched position so that the spring 76 may move the pistons 72, 74 axially away from each other. The piston assembly 70 is expandable by movement of the pistons 72, 74 away from each other and is contractible by movement of the pistons 72, 74 toward each other. Negative air pressure is applied to the cavity of the wheel hub 58 on the inner side of the diaphragm 90 to affect expansion and contraction of the piston assembly 70.

The operation of the interlock mechanism of this type is well known in the art, as is disclosed in, for example, commonly assigned U.S. Pat. Nos. 5,586,632; 5,908,080 and 5,535,869.

According to the present invention, the negative air pressure (vacuum) is routed through a wheel bearing outer race 100 disposed between a knuckle 102 and the wheel hub 58. According to a first embodiment, a passage 104 is provided through an outboard end of the wheel bearing outer race 100. An annular fitting 106 is disposed between an inner surface 108 of the outer race 100 and an outer surface 110 of the wheel hub 58. The wheel hub 58 includes one or more radial passages 112 in communication with an annular flow path 114 through the annular fitting 106. Radial passages 112 communicate with a space between end 50 of the axle shaft 30 and an interior 116 of the wheel hub 58 to allow vacuum pressure to communicate with diaphragm 90 for activating the interlock mechanism. A seal 118 is disposed at an inboard end of the wheel hub 58 between the wheel hub 58 and axle shaft 30.

Figure 3:
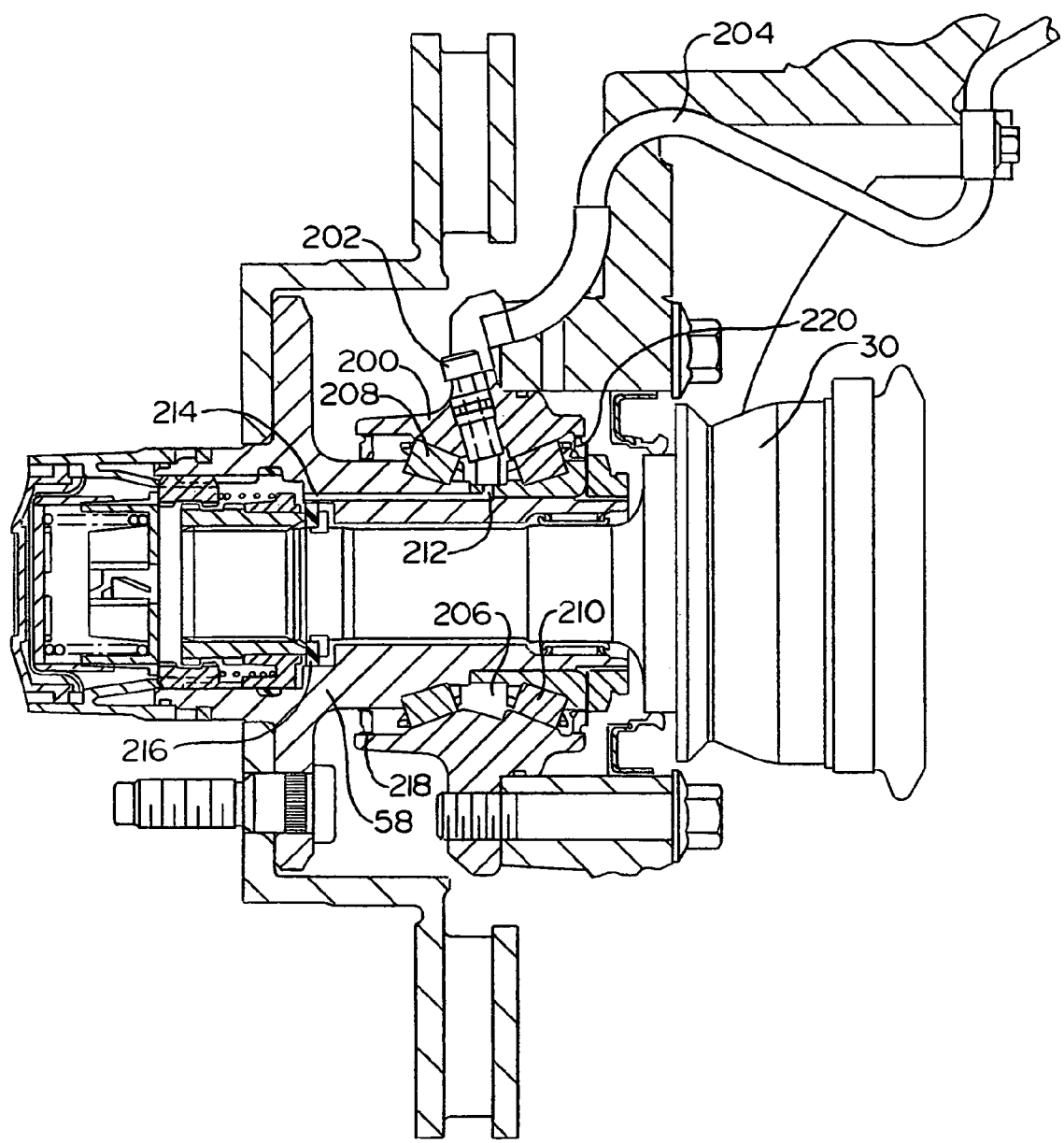
FIG. 3 is a sectional view of an interlock mechanism of a wheel end disconnect system according to a second embodiment of the present invention.

According to a second embodiment as illustrated in FIG. 3, a vacuum passage is routed through the wheel bearing outer race 200 by a vacuum fitting 202 that is adjacent to or integrally formed with the ABS sensor. A vacuum tube 204 is connected to the vacuum fitting 202 so that vacuum pressure is communicated through the vacuum fitting 202 to a space 206 disposed between roller bearing assemblies 208, 210. A generally radial passage 212 is provided in the wheel hub 58 which communicates with an axial passage 214 extending through the wheel hub 58 for communicating negative pressure with the interior of the interlock mechanism for engaging wheel hub 58 with the axle shaft 30. A seal 216 is provided between the wheel hub 58 and axle shafts 30 for sealing the interior of the interlock mechanism. In addition, seals 218, 220 are provided on each side of the wheel bearing outer race 200 for preventing escape of vacuum pressure from within the wheel bearing cavity 206. The seals 218, 220 are constructed so as to prevent debris or water from entering the bearing and also are required to withstand the interior vacuum pressure. It is also anticipated that the radial passage 212 could communicate with the space between the wheel hub 58 and axle shaft 30 as illustrated in the embodiment in FIG. 2, discussed above.

Figure 4:
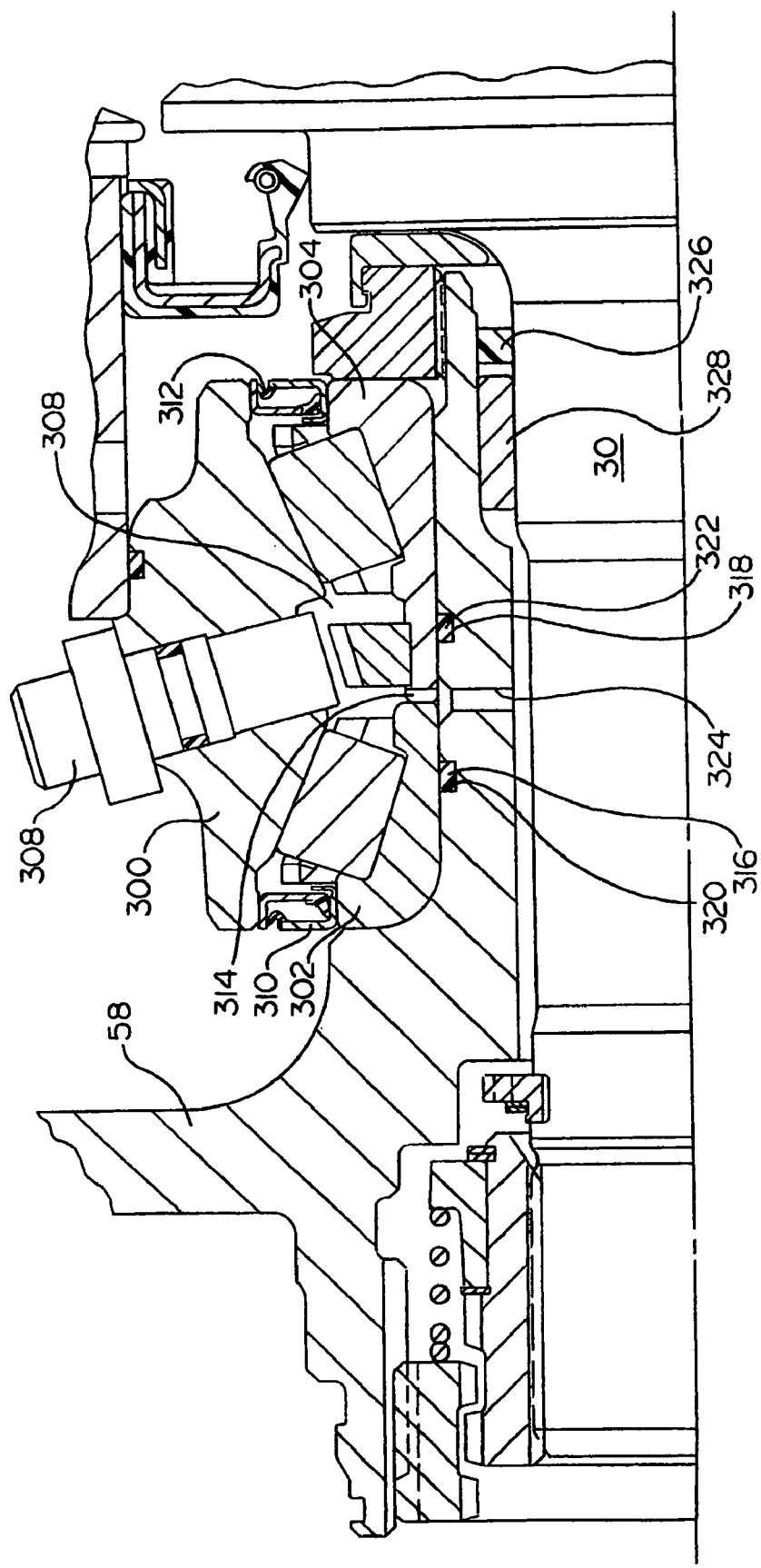
FIG. 4 is a sectional view of an interlock mechanism of a wheel end disconnect system according to a third embodiment of the present invention.

According to a third alternative embodiment, as illustrated in FIG. 4, the wheel bearing includes an outer race 300 and a pair of inner races 302, 304. The outer race 300 is provided with a vacuum fitting 306 which is adjacent to and/or integral with the ABS sensor. The vacuum fitting 306 communicates with a chamber 308 disposed between the outer race 300 and inner races 302, 304 of the wheel bearing. A pair of seals 310, 312 are disposed on the opposite ends of the wheel bearing to ensure that chamber 308 is properly sealed. A vacuum passage 314 is formed through the inner races 302, 304 of the wheel bearing which can be formed as radial passages through the inner races, or notches provided in one of the end faces of the inner races 302, 304 for defining passages radially therethrough. A pair of O-ring seals 316, 318 are provided in recessed grooves 320, 322 provided in an outer surface of the wheel hub 58 on opposite ends of the vent passage(s) 314. One or more radial passage 324 is provided through the wheel hub 58 between the recessed grooves 320, 322 so that the passage 324 communicates with a gap between the axle shaft 30 and wheel hub 58 to allow vacuum pressure to communicate with the interlock mechanism for selectively engaging and disengaging the interlock mechanism. A seal 326 is provided adjacent to a needle bearing 328 provided between an inboard end of the wheel hub 58 and axle shaft 30.

Figure 5:
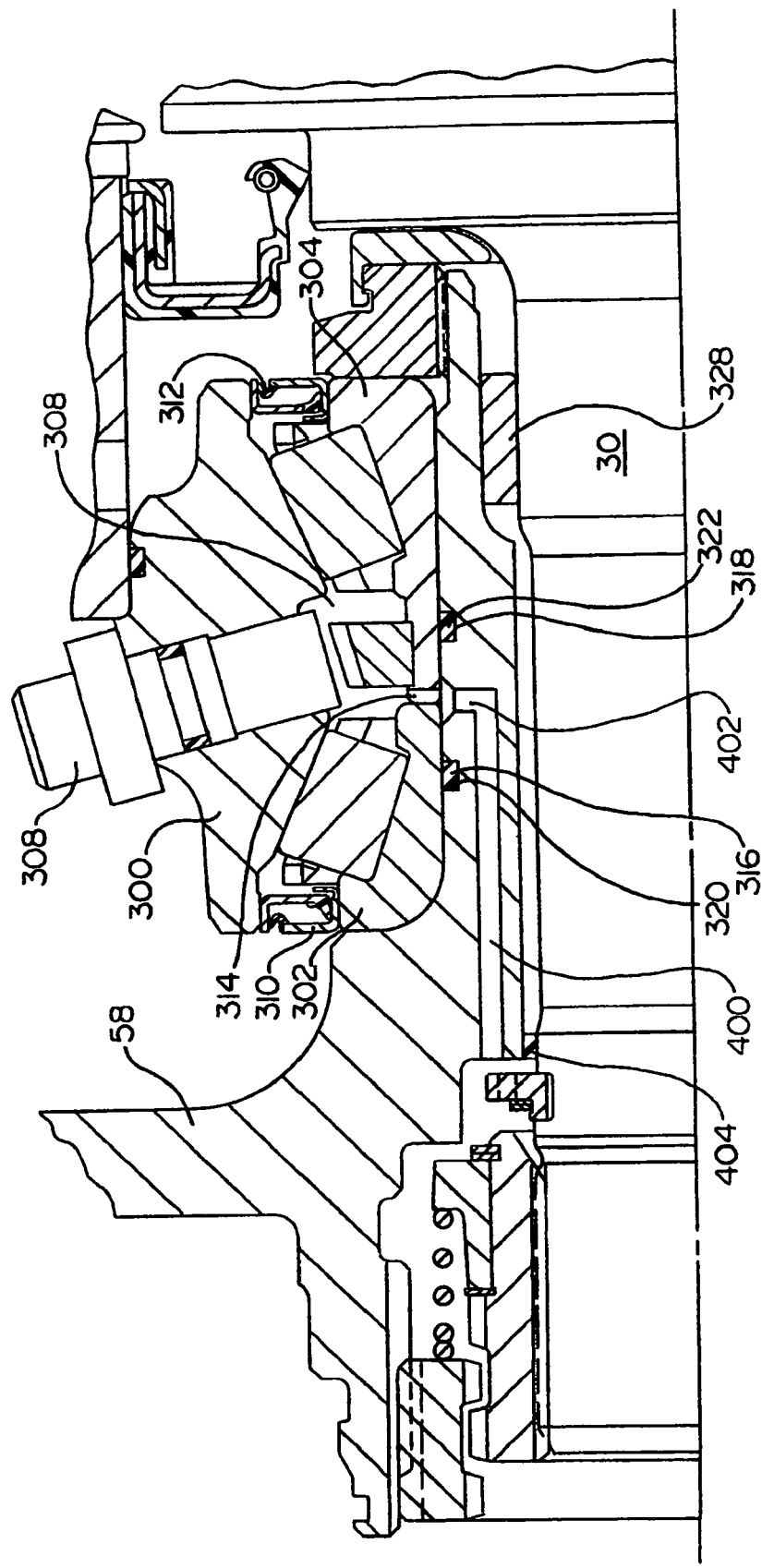
FIG. 5 is a sectional view of an interlock mechanism of a wheel end disconnect system according to a fourth embodiment of the present invention.

According to yet another embodiment, as illustrated in FIG. 5, the system of FIG. 4 is modified to include an axial vacuum passage 400 extending through the wheel hub 58 for communicating negative pressure with the interior of the interlock mechanism for engaging wheel hub 58 with the axle shaft 30. Axial vacuum passage 400 communicates with a relatively short radial vacuum passage 402 that communicates with passages through the inner races 302, 304 in the same way as disclosed in FIG. 4. With this embodiment, a seal 404 is provided between the wheel hub 58 and axle shaft 30 for sealing the interior of the interlock mechanism.

The system according to the present invention allows the wheel hub disconnect technology to be easily applied with minimal charge to the existing wheel end or knuckle designs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel end disconnect mechanism for a vehicle, comprising:
    an axle shaft;
    a wheel hub mounted to said axle shaft and rotatably mounted to said vehicle by a wheel bearing;
    an interlock mechanism for engaging and disengaging said wheel hub to said axle shaft;
    said wheel bearing including an outer race and a bearing assembly, said wheel bearing being provided with a first passage extending through said outer race, said first passage being provided in communication with a second passage extending generally radially through a wall of said wheel hub for communicating with said interlock mechanism, said first passage being connected to a source of pressurized gas for activating said interlock mechanism;
    a gas pressure fitting in said wheel bearing in communication with said first passage; and
    an annular fitting disposed between an inner surface of said outer race of said wheel bearing and an outer surface of said wheel hub, said annular fitting directly adjacent to and having a flow path in communication with said first passage and said second passage, said annular fitting configured to generally prevent communication between said flow path and said bearing assembly.

2. The wheel end disconnect mechanism according to claim 1, further comprising a seal disposed between said axle shaft and said wheel hub.

3. The wheel end disconnect mechanism according to claim 2, wherein said seal is located between and inboard end of said wheel hub and said axle shaft.

4. The wheel end disconnect mechanism according to claim 1, wherein a portion of said second passage extends axially through a sidewall of said wheel hub.

5. The wheel end disconnect mechanism according to claim 1, wherein said flow path of said annular fitting has a width generally equal to a width of said first passage.

6. A four wheel drive vehicle, comprising:
    an engine;
    a transmission drivingly connected to said engine;
    a first output shaft drivingly connected to said transmission and a second output shaft drivingly connectable to said transmission;
    a first pair of drive axles drivingly connected to said first output shaft;
    a second pair of drive axles drivingly connected to said second output shaft;
    a pair of wheel end disconnect mechanisms each including:
    a wheel hub mounted to said second pair of drive axles and rotatably mounted to said vehicle by a wheel bearing;
    an interlock mechanism for engaging and disengaging said wheel hub to said drive axles;
    said wheel bearing including an outer race and a bearing assembly, said wheel bearing being provided with a first passage extending through said outer race, said first passage being provided in communication with a second passage extending generally radially through a wall of said wheel hub for communicating with said interlock mechanism, said first passage being connected to a source of pressurized gas for activating said interlock mechanism;
    a gas pressure fitting in said wheel bearing in communication with said first passage; and
    an annular fitting disposed between an inner surface of said outer race of said wheel bearing and an outer surface of said wheel hub, said annular fitting directly adjacent to and having a flow path in communication with said first passage and said second passage, said annular fitting configured to generally prevent communication between said flow path and said bearing assembly.

7. The vehicle according to claim 6, further comprising a seal disposed between said drive axle and said wheel hub.

8. The vehicle according to claim 7, wherein said seal is located between and inboard end of said wheel hub and said drive axle.

9. The vehicle according to claim 6, wherein a portion of said second passage extends axially through a sidewall of said wheel hub.

10. The vehicle according to claim 6, wherein said flow path of said annular fitting has a width generally equal to a width of said first passage.

* * * * *